CONTINUOUS ACID TREATMENT OF PETROLEUM OILS

Jerry McAfee, Oakmont, Pa., and Albert G. Smith, Port Arthur, Tex., assignors to Gulf Oil Corporation, Pittsburgh, Pa., a corporation of Pennsylvania Application February 7, 1952, Serial No. 270,384

12 Claims. (Cl. 196—38)

This invention relates to a process for treating certain petroleum stocks, including the continuous steps of acid treatment, sludge separation, neutralization of the sour oil with aqueous alkali and washing. More particularly, the invention relates to an improved process of the type described which is characterized by greatly improved efficiency and economy and by the production of high quality products.

Sulfuric acid treatment of oils has been known since the earliest days of the petroleum industry. The purpose of the acid treatment varies according to the composition of the oil being treated, since the effect of the acid differs with various components of the oil. In the treatment of the particular petroleum stocks encompassed in the subject matter of this invention, the primary purposes of the acid treatment are in general to produce an improvement in color, to remove asphaltic and aromatic constituents, and to reduce the carbon residue.

The sulfuric acid treatment of these petroleum stocks results in two relatively immiscible phases comprising a heavier acid sludge phase and a lighter, sour oil phase. The acid sludge is removed from the mixture. The remaining sour oil contains acidic materials and accordingly must be neutralized before utilization thereof, in order to avoid corrosive characteristics in the finished oil.

Perhaps the oldest known neutralization method involves treatment of the sour oil with aqueous alkali such as a solution of caustic soda. However, this method of neutralizing sour oils is often plagued with difficulties due to emulsion formation. Emulsion formation is undesirable, since it results in high washing losses, protracted settling periods, and a poor product quality.

Formerly, it was uniform practice in the petroleum industry to acid treat both heavy and light petroleum stocks in batchwise processes. In view of the inflexibility of operation, large acid consumption, large equipment requirements and other disadvantages of batchwise processes, efforts have been made to develop satisfactory continuous treating processes. In comparatively recent years, continuous processes have been developed for the acid treatment of lighter petroleum distillates. However, proposals for continuously acid treating heavier stocks followed by neutralization with aqueous alkali have generally met with limited success because of the high washing losses due to emulsion formation and the poor quality of the product.

It is an object of this invention to provide an improved process including the continuous steps of sulfuric acid treatment of relatively heavier petroleum stocks followed by neutralization with aqueous alkali, washing and drying wherein treating and washing losses are low and product quality is high. It is a further object to provide a process of the type described wherein more efficient and economical use is made of the alkali neutralization agent. Another object is to provide a process which permits greatly increased efficiency and economy in equipment and chemicals, and reduced manpower and plant space requirements. Another object is to provide a process involving acid treating and alkali neutralization of the described oils which will greatly reduce treating time. A more limited object is the provision of a process permitting treatment of oils having a viscosity of more than 1500 Saybolt Universal seconds without the use of a diluent. Other objects will appear hereinafter.

These and other objects are accomplished by our invention which comprises a process for the continuous treatment of petroleum stocks having a viscosity of not less than 30 seconds SUV/100° F. The advantages of the invention are particularly great for stocks having viscosities in the lubricating range, i. e., those having a viscosity of greater than about 45 seconds SUV/100° F. The process includes continuously carrying out the steps of contacting a flowing stream of a petroleum stock of the class described with sulfuric acid and separating the acid sludge thus formed. A flowing stream of the remaining sour oil is contacted with an aqueous alkali solution preferably of a strength at least equal to that of 12° Bé. caustic soda solution, and partially spent alkali solution is continuously separated from the neutralized oil. The neutralized oil is then washed by introduction of steam into a flowing stream of the former. Preferably, the total steam employed is divided into two or more portions, and washing is carried out in a corresponding number of steps. The total steam employed may be varied to produce the desired product quality. Advantageously, the total steam is in excess of about 100 lbs./bbl. of oil. Following introduction of the steam, at least a portion thereof is condensed. The contact time between the steam condensate and the oil is advantageously kept between about 3 seconds and about 3 minutes. After settling to separate aqueous materials, the neutralized washed oil is dried thus producing a finished lubricating oil. Where necessary, a washing additive comprising a soap forming organic acid is injected into the sour oil stream prior to neutralization.

The invention also may include a specialized neutralization procedure which is preferably incorporated into the process described above. However, this improved neutralization step may have utility in similar processes involving water washing (as opposed to steam washing) of the neutralized oil.

The preferred neutralization procedure involves dividing the partially spent alkali solution from the neutralization step into two portions. A first portion is recycled to the sour oil stream after being blended with refortified alkali solution. A second portion is refortified with fresh alkali and is allowed to settle for a period sufficient to permit precipitation of a substantial proportion of the salts dissolved in the spent alkali solution. The refortified alkali is then blended with the first portion of spent alkali as described above.

Optimum advantages are obtained by the proper control of chemical concentrations and various processing conditions which are discussed more fully below.

In the accompanying description and drawings certain preferred embodiments of the invention have been described. It is understood that they are by way of illustration only and are not intended as limiting.

Referring briefly to the attached drawings.

Taking up the invention in more detail, the basic process concerned is one involving the continuous performance of the steps of sulfuric acid treatment of petroleum stocks having a viscosity of not less than 30 Saybolt Universal seconds at 100° F., separation of sour oil from acid sludge, neutralization of the sour oil with aqueous alkali, separation of partially spent alkali from neutralized oil, washing and drying of the neutralized oil. Within this general framework, we have provided certain novel expedients which may be employed individually or in conjunction. These expedients cooperate in a unique manner with the particular combination of steps described to provide certain improved results.

One expedient involves the utilization of a steam washing treatment, preferably in a multiple wash. Another of these novel expedients is the particular method of caustic refortification and recycling referred to above. Other expedients involve the use of a washing additive of a particular kind and in a particular manner, and control of certain processing conditions and chemical concentrations. The improved results obtained and the detailed description of the novel steps will be described below in greater detail.

Figure 1:
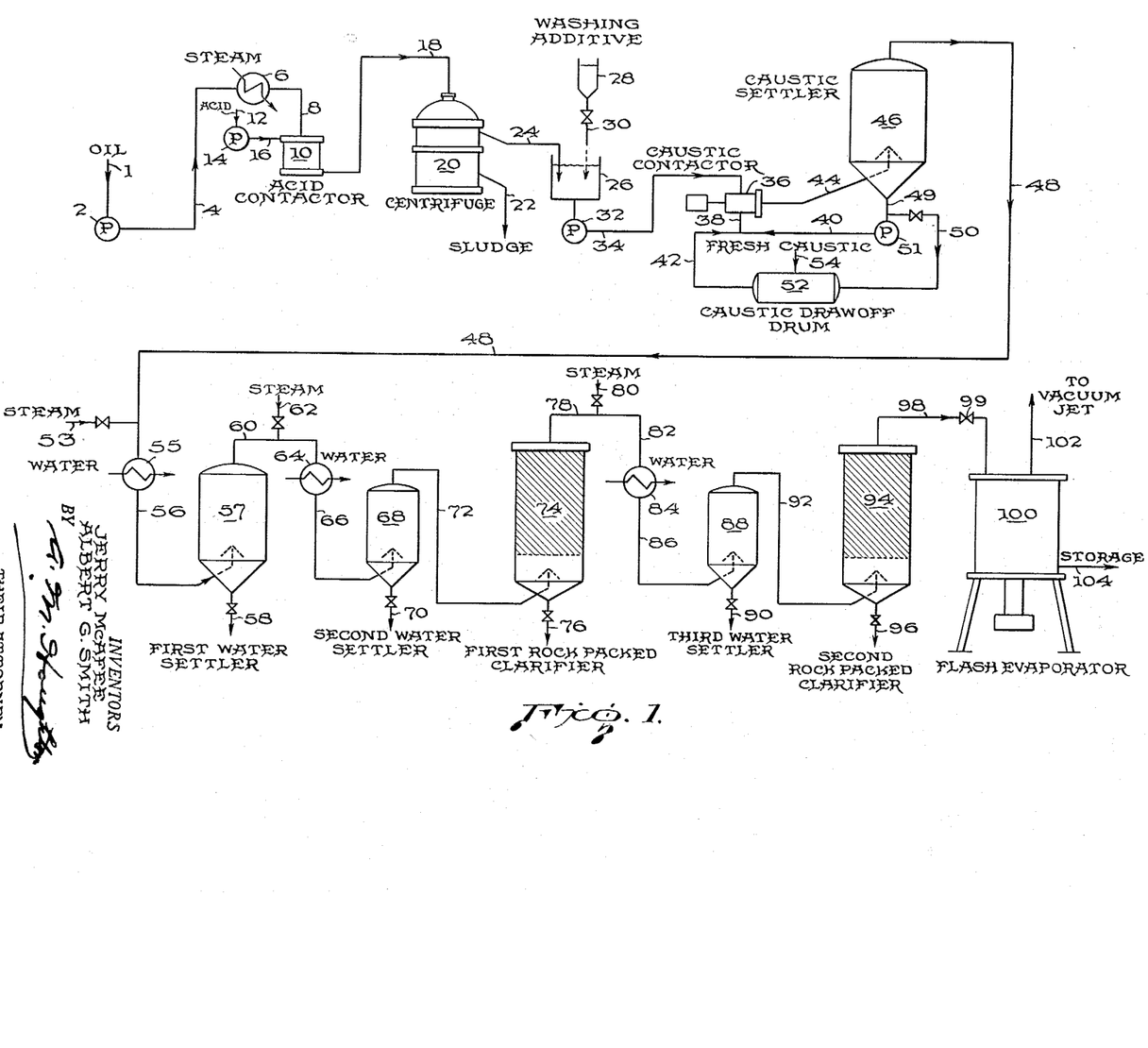
Fig. 1 is a schematic representation of an apparatus in which a preferred form of the invention may be carried out.

The invention may be more clearly understood by more detailed reference to Fig. 1. In the following description, for simplicity of explanation, the invention will be described in connection with a single preferred embodiment involving the continuous treatment of a 2500 Coastal distillate, a Coastal lubricating distillate having a Saybolt Universal viscosity of about 2500 seconds at 100° F. Throughout the accompanying description the designation of an oil by a number preceding the description thereof is intended to indicate the Saybolt Universal viscosity in seconds at 100° F. of that oil.

Referring now to Fig. 1, 2500 Coastal distillate is introduced into the system through line 1, pump 2 and line 4. From line 4 the charge oil passes through heater 6, wherein the temperature of the oil stream is raised to the desired acid contacting temperature. From heater 6 the hot distillate passes through line 8 into a mechanical agitator or contactor 10. A Stratford contactor is satisfactory for this purpose.

Sulfuric acid, preferably 98% strength, enters the system through line 12, pump 14, line 16, from which it is introduced into Stratford contactor 10.

From acid contactor 10 the sour oil-acid sludge mix is passed through line 18 into centrifuge 20. The centrifuge is designed and operated in a manner to enable the continuous separation of acid sludge from sour oil.

Acid sludge is continuously removed from centrifuge 20 through line 22. A continuous stream of sour oil is removed from centrifuge 20 through line 24 from which it passes into sour oil pot 26.

The washing additive previously referred to is metered into sour oil pot 26 at the desired rate from metering case 28 through line 30.

The sour oil-washing additive mix is continuously conducted from sour oil pot 26 through pump 32 and line 34 to horizontally mounted caustic soda contactor 36, a mechanical mixing device. Alternatively, an orifice mixer or other equivalent means may be used. A mixture of partially spent and refortified caustic soda solutions is continuously introduced into caustic contactor 36 by way of line 38.

The caustic soda solution passing through line 38 is prepared from a mixture of partially spent caustic soda solution from line 40 and refortified caustic soda solution from line 42. The flow through lines 40 and 42 may conveniently be metered by rotameters (not shown).

Neutralized oil passes from caustic contactor 36 through line 44 into caustic settler 46 in which it is distributed by a hollow, conical baffle. Neutralized oil is continuously removed overhead from caustic settler 46 by way of line 48. Partially spent caustic soda solution is removed continuously as bottoms from caustic settler 46 by way of line 49.

A first portion of this partially spent caustic soda solution is directed into line 50 and into caustic soda draw-off drum 52. Strong, fresh caustic soda solution, preferably 49° Bé., is admixed with partially spent caustic soda solution in drum 52. The fresh caustic is introduced through line 54 at a rate controlled by a valve (not shown). The fresh caustic soda solution is added in order to refortify the partially spent caustic soda solution and in order to salt out certain salts resulting from the neutralization operation. Adequate settling time is permitted in caustic soda draw-off drum 52 to allow settling of precipitated salts. These salted-out salts comprise principally sodium sulphate and sodium sulphite. Refortified caustic soda solution is withdrawn from an intermediate zone of the caustic soda draw-off drum 52 into line 42. The caustic soda draw-off drum illustrated is adapted for continuous settling. However, in certain instances it may be preferable to employ two drums for alternate use in receiving and discharging the caustic soda solution.

A second portion of partially spent caustic soda solution from caustic settler 46 is directed from line 49 through pump 51 into line 40, where it is blended with refortified caustic soda solution in the manner described.

It may be noted that caustic soda settler 46 as well as the other settlers referred to in this description are of the continuous gravity settling type.

The neutralized oil stream in line 48 contains various inorganic, water-soluble, non-volatile materials, such as unseparated caustic soda solution as well as dissolved and entrained salts. For this reason it is necessary to wash the neutralized oil. Accordingly, the neutralized oil in line 48 is directed to a washing operation which may be divided into several sections, preferably three, as illustrated in the drawings.

The first portion of the washing material, steam, is introduced by way of line 53. The steam may conveniently be proportioned into the neutralized oil stream in this and subsequent washing steps by means of a rotameter (not shown). The neutralized oil-steam mixture flows into a cooler 55, where steam is condensed, and then into line 56. The time of contact between the steam and/or steam condensate and the neutralized oil is governed by the length of lines 48 and 56 between line 53 and water settler 57. Surprisingly, it has been found that a very short period of contact, e. g., from a few seconds to a few minutes, produces substantially better results than a long period of contact.

From line 56 the washed and neutralized oil proceed into first water settler 57. The flow into this vessel is distributed by a conical baffle. This water settler is of the continuous type as was settler 46. The aqueous phase is withdrawn from settler 57 by way of line 58. A continuous stream of washed oil passes from the first water settler 57 through line 60.

A second portion of washing steam is introduced into line 60 through line 62 in the second washing stage. As in the first washing stage the steam-oil mixture passes into a cooler 64, through line 66, to the second water settling stage which comprises second water settler 68 and a first rock packed clarifier 74. Streams are withdrawn from the settled aqueous phases through lines 70 and 76 of the respective vessels. The oil is continuously passed from second water settler 68 to rock packed clarifier 74 by way of line 72.

The oil phase from rock packed clarifier 74 is removed overhead by way of line 78. Washing steam for the third washing is introduced into this stream of oil by way of line 80. As in the previous washing operations the oil-steam mixture is passed through line 82, through cooler 84 and through line 86, to a third settling stage which comprises a third water settler 88 and a second rock packed clarifier 94. Oil passes from water settler 88 to clarifier 94 through line 92. Aqueous material is withdrawn from these vessels through lines 90 and 96 respectively.

The multiple washed and settled oil stream passes from the last settling stage through line 98, through pressure controlled valve 99, and into vacuum flash evaporator 100.

Within vessel 100 the remaining unsettled water is evaporated under vacuum and removed by way of line 102. Finished oil passes from flash evaporator 100 through line 104 to storage.

The desired temperature may be maintained within vessels 46, 57, 58, 74, 88, 94 and 100 by means of steam jacketing (not shown).

The following is devoted to a detailed discussion of each of the important elements of the combination in the order in which they appear in the previous brief description of the invention.

CHARGE STOCKS

A wide variety of petroleum stocks, i. e., those having a viscosity of at least 30 Saybolt Universal seconds at 100° F., including distillates and residual stocks, are advantageously treated in accordance with the process of our invention. For example, oils ranging in viscosity from 30 to 2500 seconds SUV/100° F. are treated to advantage. This includes such oils as untreated Coastal distillates, solvent treated stocks from various crude sources, aluminum chloride treated oils, certain fuel oil distillates, and the like. In addition, residual lubricating oil stocks having viscosities in excess of 2500 seconds SUV/100° F. can also be treated according to this invention. In addition, petroleum distillates having a viscosity of 45–150 Saybolt Universal seconds which may require heavy acid treatment, i. e., in excess of about 25 lbs. acid/bbl., oil, are also benefited when refined in accordance with our process. Such stocks include those used for making transformer oils, white oils, medicinal oils, and the like.

While the broad class of charge stocks treated according to the invention are distinguished from lighter stocks such as gasoline and naphtha in that they tend to form emulsions during alkali neutralization and washing, these difficulties are more pronounced in oils having viscosities within the lubricating range, i. e., those stocks having viscosities of at least about 45 S. U. S./100° F.

Within this last class is another class of oils, i. e., those which have tendencies toward excessive emulsion formation. These oils are advantageously treated according to the present invention in conjunction with the use of a washing additive. This class of oils includes those oils having a viscosity of from 45 to 150 S. U. S./100° F. and which are treated with at least 25 lbs. acid/bbl. and oils having a viscosity greater than about 1500 S. U. S./100° F. Heavily acid treated oils or oils of high viscosity are particularly susceptible to emulsion formation and high washing loses.

ACID TREATMENT

According to this invention, stocks of the nature described are first treated in an acid contacting stage. The conditions of acid treatment of lubricating oils are well understood in the art and therefore need not be described in great detail. However, for the sake of clarity these conditions will be briefly touched upon.

With reference to acid dosage, the amount of acid employed depends upon the type of oil being treated and what the treatment is designed to accomplish. For lubricating oil stocks the acid treatment is usually designed to improve the color and color stability, remove color unstable compounds, and to increase the viscosity index, of the oil, as in the case of Coastal distillates. On the other hand, in the case of transformer oil stocks, white oil stocks, and the like the treatment is usually designed to achieve a certain percentage of unsaturates and/or a low sludging value in the finished products. Within this range of purposes the acid dosage may range from about 5 pounds of acid/bbl. oil up to 150 lbs. acid/bbl. oil. For Coastal distillates, such as Texas distillate, from 5 to 50 lbs. acid/bbl. oil are satisfactory. (About 10 lbs. acid/bbl. is a preferred dosage for heavier Coastal distillates.) For transformer oil stocks, white oil stocks and the like, i. e., petroleum distillates having a viscosity of about 45–150 SUS/100° F., from 25 to 150 lbs. acid are satisfactory. Of course, it is advantageous to employ the minimum acid dosage consistent with the desired ends.

The acid dosages given above are for 98% sulfuric acid. These quantities may vary somewhat with varying acid strength. While 98% sulfuric acid is preferred, acids of as low as 87% $H_2SO_4$ and as strong as fuming sulfuric acid (100+% $H_2SO_4$) may be employed.

The temperature of the acid treatment also varies according to the charge stock and the desired result. Generally, these temperatures are within the range of about 50° to 250° F. Examples of preferred values for various oils are: 55 Coastal distillate, about 230° F.; 85 MS Coastal distillate (a multiple solvent treated Coastal distillate having a viscosity of 85 S. U. S./100° F.), 80–100° F.; 2500 Coastal distillate, 170–185° F.

The time of acid contacting also may vary somewhat according to the oil being treated and the desired results. In the older batchwise processes contact times of as much as 90 minutes or more were necessary in order to obtain thorough treatment. The continuous process of this invention provides improved results in as little as about 10 minutes or less total contact time between acid, acid sludge and oil. Even shorter contact times are of distinct advantage, i. e., in the range of about one minute to 15 seconds or less.

SLUDGE SEPARATION

Acid treatment of the petroleum stocks described results in two immiscible phases. One is a sour oil phase, and the other is an acid sludge phase. The acid sludge must be separated before further treatment of the sour oil. In the present process a centrifugal separator was employed to effect this separation. This separator enables the continuous introduction of an oil-acid sludge mixture and the continuous withdrawal of a sour oil stream and an acid sludge stream. While other continuous separating means are known (e. g., time settling tanks such as those employed elsewhere in the process), centrifugal separation is desirable in the acid contacting stage, since it reduces the total time of contact between the acid sludge and oil. In the older batchwise processes the contact time between acid sludge and oil varied from about 4 to about 15 hours. Prolonged contact of acid sludge and oil results in a darker finished product.

The effect of the residual sludge content in the sour oil from the centrifuge was investigated in several runs. The residual sludge content was varied both by varying the charge rate to the centrifuge and by changing the dam ring size in the centrifuge. The conditions for the various runs were otherwise essentially the same. The results of these runs are indicated in Tables I and II below:

Table I

|  | Charge, 2,500 Coastal Distillate | 1 | 2 | 3 | 4 |
|---|---|---|---|---|---|
| Gravity, ° API | 20.3 | 20.9 | 20.9 | 20.9 | 20.7 |
| Viscosity (SUS): |  |  |  |  |  |
| 100° F | 2,388 | 2,134 | 2,038 | 2,082 | 2,148 |
| 210° F | 99.9 | 96.7 | 95.7 | 96.1 | 97.1 |
| Viscosity Index | 15 | 25 | 25 | 27 | 25 |
| V-G Constant | 0.864 | 0.860 | 0.861 | 0.860 | 0.861 |
| Flash, OC, ° F | 480 | 475 | 470 | 475 | 470 |
| Fire, OC, ° F | 560 | 550 | 560 | 550 | 555 |
| Pour | 0 | −5 | 0 | +5 | +5 |
| Color NPA | 8+ | 3.75 | 3.75 | 4.25 | 3.75 |
| Carbon Residue, percent | 0.25 | 0.29 | 0.27 | 0.30 | 0.29 |
| Neutralization No., A. S. T. M. D663-46T | 0.05 | 0.02 | 0.03 | 0.09 | 0.04 |
| Ash, percent | nil | 0.007 | 0.009 | 0.022 | 0.002 |
| Residual Sludge Content for Centrifuged Sour Oil (Vol. percent) | | 0.20 | 0.45 | 0.80 | [1] 0.40 |

[1] Residual sludge content varied by change of acid dam ring size.

Table II

| Run No | Charge, 2,500 Coastal Distillate | 5 | Charge, 2,500 Coastal Distillate | 6 | 7 |
|---|---|---|---|---|---|
| Gravity, °API | 20.4 | 20.8 | 20.3 | 20.5 | 20.9 |
| Viscosity (SUS): |  |  |  |  |  |
| 100° F | 2,038 | 1,934 | 2,373 | 2,245 | 2,120 |
| 210° F | 93.8 | 92.0 | 99.0 | 93.5 | 96.5 |
| Viscosity Index | 22 | 24 | 15 | 22 | 24 |
| V-G Constant | 0.865 | 0.862 | 0.864 | 0.363 | 0.860 |
| Flash, OC, °F | 470 | 470 | 465 | 465 | 475 |
| Fire, OC, °F | 545 | 550 | 560 | 560 | 555 |
| Pour | 0 | 0 | +5 | 0 | 0 |
| Color, NPA | 8+ | 4.25 | 8+ | 7.75 | 4.75 |
| Carbon Residue | 0.23 | 0.25 | 0.23 | 0.31 | 0.27 |
| Neutralization No., A.S.T.M. D663-46T | 0.03 | 0.15 | 0.07 | 0.13 | 0.03 |
| Ash, percent | nil | 0.003 | nil | 0.003 | 0.005 |
| Residual Sludge Content for Centrifuged Sour Oil | | [1] 0.90 | | [1] 2.35 | [1] 1.80 |

[1] Residual sludge content varied by change of acid dam ring size.

Figure 2:
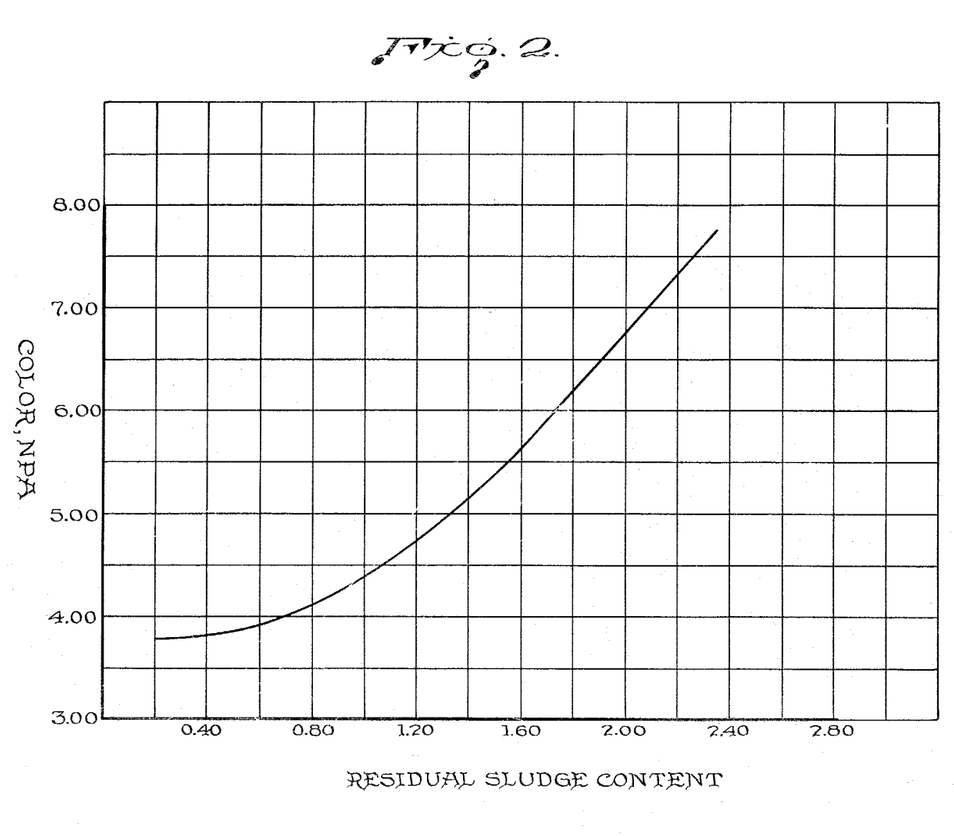
Fig. 2 is a plot of color in NPA units of the finished oil against the residual sludge content of the sour oil.

Referring now to Fig. 2 in the drawings, the effect of increased residual sludge in the sour oil from the centrifuge is clearly illustrated in the plot of residual sludge against NPA color. It will be seen that up to a residual sludge content of about 0.8 volume per cent the change in color is rather gradual but that beyond this limit the color of the finished product rapidly becomes darker. At residual sludge values of 0.5 volume per cent or below, the color of the finished oil is substantially constant and relatively light. For this reason it is preferred to effect a separation of acid sludge from sour oil to a residual sludge content of about 0.5 volume per cent or less. However, it should be noted that this value may vary slightly according to the type of oil treated. For light oils the figure may be higher and for heavier oils the figure may be lower. In general, however, the values stated apply to all stocks treated according to the invention.

Figure 3:
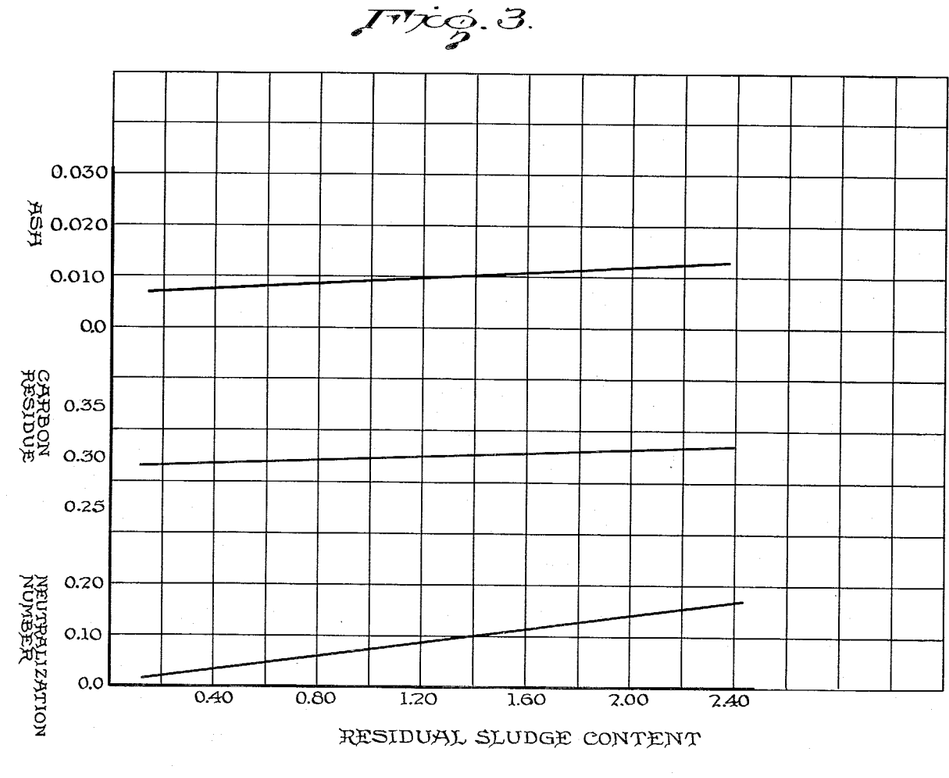
Fig. 3 shows plots of the ash content, the carbon residue and the neutralization number of the finished oil against residual sludge content of the sour oil for the same runs illustrated in Fig. 2.

Fig. 3 of the drawings plots respectively the ash content, carbon residue and neutralization number of the finished oil against residual sludge content of the sour oil stream. It will be noted that the value for each characteristic increases with increasing residual sludge values.

One method of determining the residual sludge content is to withdraw a sample of the sour oil and to effect complete separation of sludge from sour oil in a conventional laboratory centrifuge. The percent residual sludge is then calculated on the sour oil sample.

WASHING ADDITIVE

Following acid sludge separation the stream of sour oil may, in desired instances, be contacted with a washing additive or demulsifying agent prior to neutralization. In general, washing of the neutralized oil becomes more difficult with increasing viscosity and as the severity of the acid treatment increases. Consequently, as a general premise, the washing additive is desirable when treating stocks having a viscosity of 1500 SUS/100° F. or higher and when treating stocks such as white oil stocks or transformer oil stocks which, although of much lower viscosity, have been heavily acid treated, i. e., those treated with 25 or more lbs. acid/bbl. oil. Failure to employ a proper washing additive in instances of the type mentioned may lead to excessive emulsification in the settler, excessive water in the settler overhead streams, excessive washing losses, a darker color, and a higher ash content in the product.

The effect of failure to employ a washing additive in a particular case is illustrated clearly in the following tabulation which presents the results of runs carried out at essentially identical conditions.

Table III

| Run No | Charge, 2,500 Coastal Distillate | 1 | 2 |
|---|---|---|---|
| Acid Strength, Percent | | 97.8 | 97.8. |
| Acid Dosage, Lb./bbl | | 20.9 | 20.1. |
| Total Steam, Lb./bbl | | 240 | 380. |
| Additive | | None | Rosin in oil. |
| Additive Consumption, Lb./bbl | | | 1.6. |
| Inspection on Finished Oil: |  |  |  |
| Gravity, ° API | 20.4 | 21.0 | 21.2. |
| Viscosity, SUV: |  |  |  |
| 100° F | 2,219 | 1,909 | 1,906. |
| 210° F | 98.6 | 94.2 | 94.0. |
| Viscosity Index | 25 | 33 | 33. |
| V-G Constant | 0.864 | 0.859 | 0.858. |
| Color, NPA | 8+ | 8+ | 3.25. |
| Neutralization No., ASTM D663-46T | 0.04 | 0.04 | 0.03. |
| Ash, Percent | nil. | 0.362 | 0.003. |
| Unfinished Streams: |  |  |  |
| Emulsion Overhead from Settlers, Vol. Percent Water Content: |  |  |  |
| From Caustic Settler | | 0.3 | 0.3. |
| From First Water Settler | | 2–36 | 2–14. |
| From First Rock Packed Clarifier | | 12–56 | 6.0. |
| From Second Rock Packed Clarifier | | 10–46 | 5.0. |
| Washing Loss, Percent chg | | | 0.9. |

A comparison of runs 1 and 2 shows that when the washing additive was omitted (run 1), an extremely dark colored oil of prohibitively high ash content was produced. Also, a high water content was observed in the overhead from the settlers, indicating poor separation of aqueous and oily phases. On the other hand, run 2, in which a washing additive was employed, produced low washing losses, a light colored oil of very low ash content, with settler overhead streams of reduced water content. No washing loss has been shown for run 1, since the results obtained were inconsistent. However, the washing losses were invariably higher where no washing additive was employed.

A wide variety of materials may be employed as the washing additive in accordance with the invention. In general these materials are selected from soap-forming, oil-soluble organic acids, the soap of which tends to promote the formation of oil-in-water emulsions. While we do not intend to be limited to theoretical matters, it is believed that soaps of these acids aid in preventing or breaking the troublesome water-in-oil emulsions which might otherwise be formed. It is well to note that it is the soap of the acid which is the demulsifying agent, not the acid itself. The soap is formed by neutralization of the acidic additive in the caustic soda contacting step.

Agents of the type mentioned include such substances as oleic acid, rosin, rosin oil, petroleum acids and the like. Of the numerous washing additives tested, gum rosin appeared to be most suitable.

However, other acids may be used as will be indicated in the following example:

EXAMPLE I

A quantity of "100 Texas acids" (petroleum acids derived from the acid treatment of 100 Texas distillate) was obtained by acidifying the condensed steam withdrawn from the first water settlers 57 while washing 100 Texas distillate. The oily layer which separated was retained for use as a washing additive. Thereafter, these "100 Texas acids" were injected into the sour oil stream at varying rates and were found to be quite effective as emulsion breakers. When injected at a rate of 2 lbs. of additive per barrel of oil, the water content of the overhead from the settlers approximately equaled that obtained while using 1 lb./bbl. of rosin as a washing additive.

The soap-forming organic acid may be added directly to the stream of sour oil flowing to the caustic contactor. Alternatively, it may first be compounded into the form of an oil concentrate followed by injection into the oil stream at the same point. The latter method is preferred, particularly in the case of solid additives, since the use of a liquid concentrate facilitates handling. Concentrates have been prepared, for example, by adding gum rosin to 1900/5 Texas oil (a Coastal distillate having a viscosity of 1900 seconds SUV/100° F. and an NPA color of 5) heated to about 200° F. and air blowing until the rosin went into solution (about 12 hours). Alternatively, the gum rosin may be melted and added to the heated oil vehicle.

The soap-forming organic acid, having been injected into the sour oil stream, reacts with the caustic soda solution in the caustic contactor, to form in situ the desired soap. This procedure has been found superior to direct use of the preformed soap.

The amount of additive necessary to effectively prevent emulsion formation will, of course, depend upon the oil to be treated, upon the particular additive employed, and to some extent upon the efficiency of the settlers. For example, a series of runs were made with varying amounts of rosin added as a washing additive to determine the minimum amount that could be used. These runs indicated that as the rosin rate was decreased from 1.4 to 0.6 lbs. rosin per barrel of oil, the water content in the oil overhead from the settlers increased. This in turn resulted in unnecessarily overloading the drier, increased washing loads and increased ash content. The amount of gum rosin used in all tests varied from as low as 0.5 lb./bbl. to 5 lbs./bbl. a preferred range being from 1 to 2 lbs./bbl. It should be noted, however, that the figures given for the quantity of additive employed refer to the concentration of additive in the flowing stream of sour oil to be neutralized in caustic settler.

When the additive is employed in the form of a concentrate, the concentrate will contain considerably more of the additive, which can be present in an amount as high as 2 lbs./gal. and higher. To illustrate, a concentrate of 2 lbs./gal. was made by dissolving gum rosin in 1900/2.5 Texas oil (a Coastal distillate having a viscosity of 1900 S. U. S./100° F. and an N. P. A. color of 2.5) and this concentrate was then injected in the centrifuged sour oil at a rate sufficient to result in 2 lbs./bbl. of rosin in the flowing stream of sour oil.

SOUR OIL NEUTRALIZATION

Following acid treatment of the oil, separation of acid sludge, and in instances where applicable, the injection of a washing additive, the sour oil stream is directed into the caustic contactor, where neutralization is effected. Neutralization is effected by admixture and thorough agitation of the sour oil and aqueous alkali.

Although the invention has been described with particular reference to caustic soda solution (NaOH) as the neutralizing agent, it is not limited thereto. Other water soluble, inorganic alkalies may be used. By "water-soluble, inorganic alkalies" is meant the hydroxides or carbonates of alkali metals or mixtures of these. The term, of course, does not include basic compounds of alkaline earth metals. Examples of inorganic alkalies which may be employed in addition to or in lieu of caustic soda are potassium hydroxide and soda ash (commercial sodium carbonate).

Varying the caustic contact temperature was found to have no appreciable effect on the results obtained. The only effect noted was that relatively higher temperatures produced a product of slightly lighter NPA color. In general the caustic contacting temperature may be varied between about 100° and about 250° F. In fact higher temperatures, e. g., up to 300° or 350° F. may be employed when pressure is utilized. However, due to the increased cost of pressure equipment, little advantage is obtained thereby. Temperatures lower than about 100° F. are not recommended, particularly with heavier stocks because of increased viscosities and poorer mixing at these lower temperatures. For reasons of general economy and quality of product a temperature of about 200° F. is preferred for all stocks.

With regard to the strength of the caustic neutralization solution, variation thereof produced no effect on product quality. However, the strength of the caustic soda solution is quite important, since it greatly affects the degree of break in the caustic settler. When caustic soda solution having a strength of 10°–12° Bé. or above is employed, a good break between the water and oil phases is obtained in the caustic settler, the overhead therefrom containing only 0.8% or less caustic soda carryover. However, where below 10°–12° Bé. caustic soda solution is employed, the overhead from the caustic settler has been found to contain as much as 20% caustic soda carryover. This operates to waste reusable alkalinity, to overload the drying equipment, and to produce a product of higher ash content. Thus, a lower capacity continuous dryer may be employed and an improved process results where caustic solution of at least about 12° Bé. is used.

Of course, the strength of the neutralizing solution will vary somewhat with varying alkalies. Regardless of the particular neutralizing agent, a solution having an alkalinity equivalent to that of a caustic soda solution having a strength of at least about 12° Bé. is preferred.

Variation in the rate of introduction of aqueous caustic soda into the stream of sour oil produced no appreciable difference in the product. A caustic soda solution: oil volume ratio of less than about 1:1 did, however, produce a somewhat poorer break in the caustic settler with the accompaniment of the above-mentioned disadvantages. Any volume ratio between about 1:1 and 5:1 is satisfactory, with no advantage in going higher. A volume ratio of about 2:1 is preferred, since the excess of caustic soda insures thorough neutralization.

The optimum caustic settling temperature varies according to the nature of the charge stock, since more viscous oils present a more difficult settling problem. A generally satisfactory range of temperatures is between about 150° and 250° F. or higher, if pressure equipment is available. A temperature of about 200° F. is preferred for all stocks.

The optimum settling time is the minimum in which a good break can be obtained. At preferred temperatures and caustic soda concentrations, a settling time of about one hour is adequate. This time may, however, require some adjustment, where these conditions are varied.

The factors mentioned above apply to any continuous method of alkali neutralization. It is preferred, however, to employ the particular refortification procedure mentioned previously.

In this connection, it may be noted that we do not assert ourselves as the inventors of the broad concept of caustic neutralization of oils followed by refortification and recycling of spent caustic. However, we have provided a novel refortification procedure by which more efficient and unusual results are obtained. This particular refortification procedure may be employed to advantage with any continuous process of the type described, regardless of the nature of the washing treatment which follows neutralization of the sour oil. However, the most advantageous process is that in which this particular refortification procedure is combined with the steam washing described hereinafter.

In more detail, it was pointed out above that caustic soda solution is employed in greater strength and quantity than that theoretically necessary to neutralize excess acid in order to insure thorough neutralization and a good break between the oily and aqueous phases in the caustic settler. The surplus or partially spent caustic soda solution continuously accumulates at the bottom of the continuous caustic settler. This partially spent caustic soda solution is drawn off and divided into two portions. A first portion is mixed with refortified caustic soda solution having a strength of more than about 12° Bé. and preferably of 20°–30° Bé., in an amount to provide recycle caustic soda solution having a strength of 12° Bé. or above. The mixture is then recycled to the caustic contactor. The remaining partially spent caustic soda solution is drawn off as the second portion and conducted to a caustic drawoff drum. This partially spent caustic soda solution is refortified to more than 12° Bé., and preferably to 20°–30° Bé. by the addition of strong, fresh (preferably 49° Bé.) caustic soda solution and allowed to stand for a period sufficient to settle a substantial portion of precipitated salts, preferably about 24 hours. The settling period allows settling of salted out solids comprising primarily sodium sulfate and sodium sulfite. Refortified caustic soda solution is pumped from an intermediate level in the drawoff drum to the recycle caustic line in the proportion stated. The precipitated solids are removed from the bottom of the drum periodically.

The described procedure has the unique result of permitting effective use of substantially all of the alkalinity charged to the system, since the caustic soda solution may in this manner be used indefinitely. If this procedure were not employed some of the low strength caustic would have to be discharged.

In view of the large quantities of caustic soda solution involved in large scale operations, this savings is considerable. It may be noted that if fresh caustic soda solution were added to a typical unit in a once-through operation using a 1:1 caustic soda solution to oil volume ratio (the minimum desirable ratio) the amount of fresh caustic soda solution necessary for a unit charging 1000 bbl. oil/day would be 1000 bbl./day, a prohibitive quantity. This procedure would result in leaving a great amount of unused alkalinity in the discharged caustic soda solution.

It is emphasized, however, that it is necessary to permit a substantial proportion of solids capable of being salted out by the strong, fresh caustic soda solution to be precipitated. If adequate settling is not permitted, these salts accumulate in the recycle stream. This results in excessive emulsion formation in the caustic settler. In fact, failure to permit settling of refortified caustic soda solution has resulted in complete emulsification of the oil and caustic soda in the caustic settler.

STEAM WASHING

A continuous overhead stream of neutralized oil is removed from the caustic settler. This stream is subjected to one or more washing and settling operations. We have discovered that certain unexpected advantages are present in the utilization of a steam washing procedure in conjunction with the continuous acid treatment and neutralization of the petroleum stocks described. This procedure is advantageous whether or not the particular caustic recycling method described is employed. Of course, the most superior results are produced when the two are combined in the same process.

The preferred procedure for carrying out the steam wash is to inject steam continuously at the desired rate into the stream of neutralized oil from the caustic settler. The neutralized oil-steam mixture is conducted through a cooler in order to condense at least a portion of the steam. The neutralized oil-condensed steam mixture is thereafter conducted into a water settler to permit separation of the oily and aqueous phases. Alternatively, the steam may be injected into the oil while the latter is flowing through the cooler.

As will be noted the time of contact between the steam and for steam condensate and oil is very short. This is of advantage in a continuous procedure, since no large contacting equipment or long contact time is necessary. Moreover, it has been found that a contact time of as little as three minutes or less produces better results than a longer contact time. In this connection two runs were made on identical charge stocks and under substantially identical conditions with the exception that the steam-oil contact time of the first run was about sixty minutes and in the second run the contact time was about 2–3 minutes. The ash content of the product of the first run was 0.057% and that of the second run was 0.026%. In general satisfactory contact times are from a few seconds to about 3 minutes, with from about 30 seconds to one minute being preferred. Somewhat longer contact times may of course be employed but are disadvantageous for the reasons pointed out above. The contact times mentioned are cumulative, regardless of the number of washes.

Without intention to limit the invention to any theory, it appears that the washing would be effected by the steam condensate rather than by the steam itself. However, this theory does not provide any explanation for the unexpectedly superior results produced by steam washing as opposed to water washing.

The total amount of steam utilized depends upon the relative ease with which the oil may be washed. This in turn depends upon factors previously mentioned. The preferred amount of steam employed is of course the minimum necessary to produce the desired quality of product. It has been found that three steam washes totalling at least about 100 lbs. steam/bbl. produced satisfactory results. With oils more difficult to wash, steam:oil ratios of up to 250–400 lb./bbl. or more may be desirable.

In order to illustrate more clearly the unexpected advantages resulting from steam washing as opposed to water washing the results of several experiments are tabulated below:

Table IV

| Run No | Charge, 2,500 Coastal Distillate | 1 | 2 | 3 | Charge, 2,500 Coastal Distillate | 4 | 5 | 6 | 7 |
|---|---|---|---|---|---|---|---|---|---|
| Acid Dosage, lbs. acid/bbl. | | 20.1 | 9.9 | 4.2 | | 5.4 | 9.4 | 18.5 | 19.5. |
| Acid Strength | | 97.8 | 97.8 | 97.8 | | 97.8 | 97.8 | 97.8 | 97.8. |
| Steaming Conditions: | | | | | | | | | |
| Total Steam Used, lbs./bbl. | | 380 | 340 | 370 | | | | | |
| Points of Injection— | | | | | | | | | |
| 1st Stage | | Overhead from Caustic Settler. | Overhead from Caustic Settler. | Overhead from Caustic Settler. | | | | | |
| 2nd Stage | | Overhead from 1st Water Settler. | Overhead from 1st Water Settler. | Overhead from 1st Water Settler. | | | | | |
| 3rd Stage | | Overhead from 1st Rock-Packed Clarifier. | Overhead from 1st Rock-Packed Clarifier. | Overhead from 1st Rock-Packed Clarifier. | | | | | |
| Water Washing Conditions: | | | | | | | | | |
| Total Water Used—Vol./Vol. Oil | | | | | | 12 | 12 | 12 | 12. |
| Points of Injection: | | | | | | | | | |
| 1st Stage | | | | | | Stream to 1st Water Settler. | Stream to 1st Water Settler. | Stream to 1st Water Settler. | Stream to 1st Water Settler. |
| 2nd Stage | | | | | | Stream to 2nd Water Settler. | Stream to 2nd Water Settler. | Stream to 2nd Water Settler. | Stream to 2nd Water Settler. |
| 3rd Stage | | | | | | Stream to 3rd Water Settler. | Stream to 3rd Water Settler. | Stream to 3rd Water Settler. | Stream to 3rd Water Settler. |
| Inspections: | | | | | | | | | |
| Finished Oil— | | | | | | | | | |
| Color, NPA | 8+ | 3.25 | 3.75 | 4.75 | 8+ | 6.50 | 5.25 | 4.25 | 4.25. |
| Ash, percent | nil | 0.003 | 0.006 | 0.001 | 0.002 | 0.031 | 0.027 | 0.047 | 0.034. |
| Losses: | | | | | | | | | |
| Loss to Sludge, percent of charge | | 4.7 | 4.0 | | | | 3.3 | 4.3 | 4.1. |
| Loss to Wash, percent of charge | | 0.9 | 2.9 | | | | 2.6 | 5.5 | 6.5. |
| Total Losses, percent of charge | | 5.6 | 6.9 | | | | 5.9 | 9.8 | 10.6. |

Figure 4:
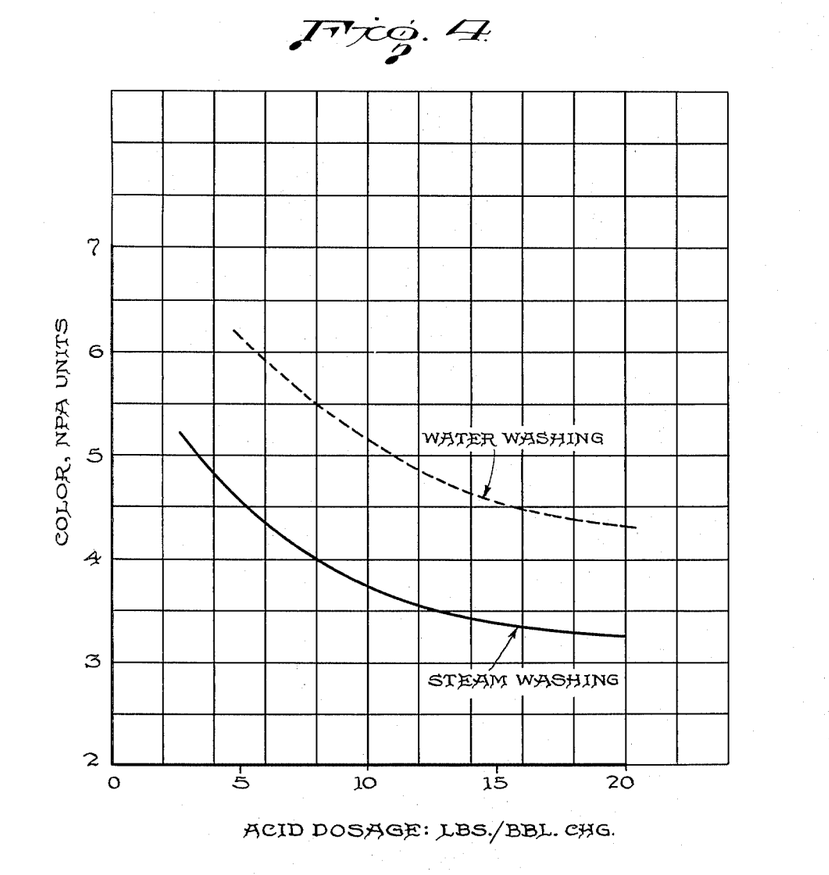
Fig. 4 is a plot of color of the finished oil in NPA units against acid dosage for two sets of runs, the upper curve being for runs in which water washing was employed and the lower curve being for runs in which steam washing was employed.

Referring now to Fig. 4 of the drawings two curves are shown, the lower of which plots acid dosage against NPA color for the steam washing runs (runs 1, 2, and 3) and the upper of which plots acid dosage against NPA color for the water washing runs (runs 4–7). A comparison of these curves will clearly demonstrate that by employing a steam wash instead of a water wash a marked superiority in the color of the finished oil is produced. This superiority is greater than one NPA unit in all cases on an equal acid dosage basis. From another standpoint, an acid dosage of 4.2 lbs./bbl. oil with steam washing produced a finished oil having the same color as would the same oil with an acid dosage of 13 lbs./bbl. oil and with water washing, a reduction of about ⅔ in acid requirements.

In addition to the advantages mentioned steam washing in the majority of instances is greatly superior to water washing in that washing losses, in most cases are reduced remarkably. In run 1 of Table IV, for example, with an acid dosage of 20.1 lbs. acid/bbl. oil and steam washing, the washing losses amounted to 0.9% by volume based on the volume of charge. On the other hand, in run 7 of the same table, with an acid dosage of 19.5 lbs. acid/bbl. oil and water washing, the washing losses amounted to 6.5 volume per cent.

These remarkable advantages were completely unexpected. Although steam washing of neutralized sour oils has been previously known in batch processes, the advantages noted above were not obtained therein. Moreover, in such batchwise steam treatments the time of contact for these batch processes was very lengthy and therefore incapable of efficient adaptation to a continuous process.

In order that a more clear indication of the superiority of the present invention may be had the results of certain experiments involving batchwise acid treatment, sludge separation, alkali neutralization and steam or water washing are presented below.

Table V

| Run No | Charge, 2,500 Coastal Distillate | 1 | 2 | 3 |
|---|---|---|---|---|
| Acid Dosage, Lbs. Acid/Bbl | | 5 | 10 | 20. |
| Acid Strength, percent H₂SO₄ | | 99.0 | 99.0 | 99.0. |
| Steaming Conditions: | | | | |
| Condensed Steam Used, Gal./Bbl | | 81 [1] | 80 [1] | (2). |
| Point of Injection | | Neutralized Oil Batch. | Neutralized Oil Batch. | Neutralized Oil Batch. |
| Inspections: | | | | |
| Color, NPA | 3.25 dil.[3] | 3.75 dil.[3] | 3.25 dil.[3] | |
| Ash, percent | 0.003 | 0.003 | 0.001 | |
| Losses: | | | | |
| Loss to Sludge, percent of charge | | 3.5 | 5.2 | |
| Loss to Wash, percent of charge | | 15.1 | 11.3 | |
| Total Loss, percent of charge | | 18.6 | 16.5 | |

[1] Sour oil was neutralized with caustic soda and washed 9 times using only steam condensate and live steam.
[2] Sour oil was neutralized and water washed using steam condensate and live steam; after 4th wash a water-oil emulsion was formed which would not break.
[3] Dilute test; sample diluted with 85% by volume water white kerosine to 15% by volume oil (ASTM D-155-45T)

A comparison of the results presented in Table V above with the results shown in runs 1–3 of Table IV indicates the superiority of steam washing in a continuous process over steam washing in a batch process. Although substantially greater amounts of steam were employed in the batchwise runs of Table V, the color of the finished oil was either unimproved or darker than that of the original oil. In this connection it may be noted that an NPA color of 3.25–3.75 dilute corresponds approximately to a standard NPA color of 7–8.

Even more striking are the reductions in washing losses produced by the invention. Runs 1 and 2 of Table IV had total losses of 5.6 and 6.9% with acid dosages of 20.1 and 9.9 lbs. acid/bbl. respectively. Runs 3 and 2 of Table V which employed comparable acid dosages of 20 and 10 lbs. acid/bbl. respectively had much greater losses. In fact, in run 2 of Table V the losses were 16.5%, and in run 3 of Table V the entire sample of oil became emulsified.

As mentioned above, three steam treatments were found to effect the most satisfactory compromise between economy and quality of product for 2500 Coastal distillate. The steam washing may in other instances be effected in one or two treatments.

In this connection it should be pointed out that multiple steam washing in the present invention, of itself produces results which are superior to a single steam washing, even though the same quantity of steam is employed. This effect is indicated by the experimental results for the two runs tabulated below.

water settler amounts to about 4% or more, an oil of increased ash content was produced. Also, an improperly washed oil (such as that produced by too rapid a charge rate through the washing settlers) will be darkened in color. Thus, the time of water settling is preferably sufficient to provide a water content in the overhead from the final settler of less than about 4%. Generally about two hours settling time is sufficient in the water settlers.

The water settling temperature range may be varied generally between about 100° to 250° F. with satisfactory results. It should be kept in mind that as the temperature is reduced, the viscosity of the oil increases. Thus, settling becomes more difficult at lower temperatures, particularly in the case of heavier stocks. In the instance of 2500 Coastal distillate it was found that a settling temperature of 150° F. increased the water content to the extent that it was impossible to dry the product continuously. On the other hand, a temperature of 150° F. would be satisfactory for a somewhat lighter oil. A settling temperature of about 200° F. has been found to be most satisfactory for all stocks treated.

Settling temperatures higher than 250° F. may also be used, but to little advantage. In fact, increased settling temperatures may darken the color of the final product.

Reference has been made to the beneficial results of our novel method of caustic refortification and recycle as well as to the novel effects of a steam wash, and particularly a multiple steam wash, with respect to the use of each in a process involving the continuous acid

Table VI

| Run | Charge, 2,500 Coastal Distillate | 1 | Charge, 2,500 Coastal Distillate | 2 |
|---|---|---|---|---|
| Acid dosage | | 20.7 | | 20.3. |
| Acid Strength | | 97.8 | | 97.8. |
| Steaming Conditions: | | | | |
| 1st Stage | | Overhead from first Water Settler. | | Overhead from first Water Settler. |
| 2nd Stage | | | | Overhead from first Rock-Packed Clarifier. |
| Total Steam, lbs./bbl | | 190 | | 190. |
| Inspections: | | | | |
| Finished Oil: | | | | |
| Color, NPA | 8+ | 4.00 | 8+ | 3.50. |
| Ash, percent | nil | 0.013 | nil | 0.003. |

A comparison of the two runs indicates clearly that although the same amount of steam was employed in each run, superior results both with respect to color and ash were produced in the finished product with multiple washing.

Following each steam wash the neutralized oil-steam condensate mixture is introduced into a water settler to permit separation of oil and water phases. As mentioned, each of the last two water settling stages employed in these experiments comprises two vessels, the first being a conventional water settler and the second being a rock packed clarifier. The rock packed clarifier was placed in series with each of the last two water settlers simply to provide a larger settling volume, and hence longer settling time. These pairs of vessels could obviously be replaced with a single vessel of equivalent volume. The rock packing is not necessary but was employed simply for reasons of expedience. Thus, although two vessels were employed in each of the last two water settling stages, each pair of vessels may be regarded simply as a single water settler.

Both the time and temperature of the water settling stages have been varied to determine the effect, if any, of these variables. In this connection the time of settling was varied by increasing the charge rate to the washing system. It was found that as the throughput increased, the water content overhead from the settler increased. Where the water content of the overhead from the final treatment and alkali neutralization of certain petroleum stocks. As also pointed out previously, an optimum process is produced by a combination of the described expedients preferably with simultaneous control of chemical strengths and processing conditions. An example of typical conditions and results obtainable by the optimum process involving all of the improvements will be found in the tables below:

Table VII

Acid treating conditions:
  Acid strength, per cent $H_2SO_4$____ 97.8.
  Acid dosages, lbs. acid/bbl. oil____ 10.3.
Temperatures, ° F.:
  Oil from heater_________________ 165.
  Oil to contactor________________
  Oil from contactor______________ 168.
  Oil to centrifuge_______________
  Sour oil from centrifuge_________ 123.
Caustic washing condtions:
  Strength of recycle caustic soda, lb. NaOH/gal _________________ 2.23.
  Volume of recycle caustic soda, vol./vol. oil _______________ 5.0.
  Caustic soda consumption, lbs. NaOH/bbl. oil _______________ 1.8.
  Temp. of oil from caustic settler, ° F _____________________ 208.

Washing conditions:
- Quantity of washing steam, lb./bbl.:
  - First stage ______________ 75.
  - Second stage ____________ 65.
  - Third stage _____________ 35.
  - Total steam_____________ 175.
- Washing additive:
  - Additive used ___________ Rosin in oil.
  - Point of injection_________ Sour oil stream.
  - Concentration, lb./gal_____ 2.0.
  - Consumption, lb./bbl. oil___ 1.4.
- Temperatures, ° F.:
  - Overhead from first water settler__ 205.
  - Overhead from second water settler 202.
  - Overhead from third water settler__ 198.
  - Overhead from rock-packed clarifier No. 1 ______ 203.
  - Overhead from rock-packed clarifier No. 2 ______ 200.
  - Oil from first-stage steam condenser 151.
  - Oil from second-stage steam condenser __________ 150.
  - Oil from third-stage steam condenser __________ 133.
- Drying conditions:
  - Oil from flash evaporator, ° F____ 245.
  - Vacuum in flash evaporator, in Hg__ 29.

The results produced in this run are presented in Table VIII below:

*Table VIII*

|  | Charge, 2,500 Coastal Distillate | Finished Oil |
|---|---|---|
| Inspections: |  |  |
| Gravity, °API | 20.6 | 20.9 |
| Viscosity, SUS— |  |  |
| 100° F | 2,412 | 2,133 |
| 210° F | 101.6 | 97.3 |
| Viscosity Index | 21 | 27 |
| V-G Constant | 0.860 | 0.860 |
| Color, NPA | 7.50 | 3.75 |
| Carbon Residue | 0.36 | 0.27 |
| Neutralization No., ASTM D663-46T | 0.08 | 0.03 |
| Ash, percent | 0.002 | 0.002 |
| Unfinished Streams: |  |  |
| Centrifuged Sour Oil— |  |  |
| Gravity, °API |  | 20.9 |
| Residual Sludge Content, Vol. percent |  | 0.25 |
| Wet Oil Overhead from Settlers, Vol. Percent Water Content— |  |  |
| From Caustic Settler |  | 0.4 |
| From First Water Settler |  | 1.2 |
| From Second Water Settler |  | 14.0 |
| From Third Water Settler |  | 4.0 |
| From First Rock-Packed Clarifier |  | 2.2 |
| From Second Rock-Packed Clarifier |  | 0.4 |

An examination of Table VIII will indicate that by the optimum process a product is obtained which has a very light color, a reduced carbon residue and an acceptable ash content. By acceptable ash content we mean no additional refining treatment is required prior to compounding and/or marketing. In general, an ash content of 0.005% or less in non-additive type lubricating oils requires no further treatment to reduce the same. Over extended periods of operation we have found that an oil of light color having an ash content averaging 0.002% and lower may be produced consistently by the preferred technique.

The examples throughout the specification have been primarily in connection with a 2500 Coastal distillate stock for the sake of simplicity and uniformity. However, in the general discussion of the processing conditions, the variations possible with lighter stocks have been indicated. As specific examples of the variations in processing conditions possible for such lighter stocks, the conditions employed in two typical runs are given below:

*Table IX*

|  | 80-85 MS Coastal Distillate | 100 Coastal Distillate |
|---|---|---|
| Acid Strength, percent $H_2SO_4$ | 102.5 | 97.8 |
| Total Acid Dosage, Lb. Acid/Bbl. Oil | 95.3 | 11.0 |
| Oil to Contractor, °F | 78 | 136 |
| Strength of Recycle Caustic Soda Soln., Lb NaOH/Gal | 2.24 | 2.42 |
| Volume of Recycle Caustic Soda Soln., Vol./Vol. Oil | 2.5 | 5 |
| Caustic Soda Soln. Contacting Temperature, °F | 175 | --- |
| Temp. of Oil from Neut. Settler (W. S.-1), °F | 198 | 206 |
| First Stage Steam, Lb./Bbl | --- | --- |
| Second Stage Steam, Lb./Bbl | --- | --- |
| Third Stage Steam, Lb./Bbl | --- | --- |
| Total Steam Consumed, Lb./Bbl | 200 | 130 |
| Washing Additive Used | None | None |
| Overhead from First Stage Water Settler, °F | 195 | 203 |
| Overhead from Second Stage Water Settler, °F | 196 | 201 |
| Overhead from Third Stage Water Settler, °F | 192 | 199 |
| Oil from Flash Evaporator, °F | 245 | 245 |
| Flash Evaporator Vacuum, In. Hg | 29 | 29 |
| Yields: |  |  |
| Finished Oil, Vol. percent | 77.8 | 95.5 |
| Oil Lost to Sludge, Vol | 9.0 | 1.2 |
| Washing Loss (By difference) | 13.2 | 3.3 |

A comparison with typical processing conditions for heavier stocks may be had by comparing the conditions cited in Table IX with those in Table VII.

It may be noted that the run carried out on 80-85 MS Coastal distillate employed no washing additive although it involved a heavy acid treatment, and that a washing loss of 13.2 per cent resulted. While this loss appears high, it is only about two-thirds that which occurs with batchwise treatment of the same stock. As indicated previously, the washing loss may be reduced still further by the use of a washing additive.

The above description and specific embodiments are intended to be only illustrative of a process which has been found highly advantageous for the treatment of petroleum stocks of the type described. Resort may be had to such modifications and variations as fall within the spirit of the invention and the scope of the claims hereinafter made. In this connection, it should be noted that our invention is not necessarily restricted to any given number of steam washings, or water settlings.

To reiterate briefly the primary features of the invention, the fundamental process involved is one of continuous acid treating, alkali neutralization, and washing of certain petroleum stocks. Upon these basic steps we have superimposed certain novel expedients.

One of these expedients is the novel method of caustic refortification and recycling, which possesses certain unique advantages in the combination described with respect to maximum utility of chemicals, quantity and quality of the finished oil.

Another expedient involves the use of steam washing in the combination described. This step cooperates in a unique manner with the particular combination of steps to produce an unusually light colored, finished product of low ash content. This step also permits reduced washing losses. The beneficial effects of steam washing are heightened by dividing the total steam employed into two or more portions to provide a multiple washing procedure.

Other expedients involve the use of a washing additive in particular cases and close control of processing conditions, as indicated in the discussion thereof, whereby improved results are obtained.

Ideally all of the expedients are combined in the same process to provide a process of maximum efficiency and remarkably improved products.

Among the advantages achieved by the invention are greatly reduced plant space requirements, a greater ability to reproduce or control results, lighter colored products, products of reduced ash content, greatly reduced treating losses, greatly reduced treating times, reduced chemical cost and consumption, the ability to treat oils of a viscosity greater than 1500 S. U. S./100° F. without the use of a diluent and a redistillation, and the elimination of subsequent clay treatment for many oils, in particular those having a viscosity of greater than 1500 S. U. S./100° F. In instances where clay treatment is still desired, the invention permits a less drastic and therefore more economical clay treatment.

What we claim is:

1. A process for treating petroleum stocks comprising continuously carrying out the steps of introducing sulfuric acid into a flowing stream of a petroleum stock having a viscosity of at least about 45 S. U. S./100° F. and which has excessive emulsion forming tendencies during alkali neutralization and washing, separating acid sludge from sour oil, introducing into a stream of the sour oil a minor proportion, about 0.5 to about 5 pounds per barrel of oil of an oil-soluble, organic, soap-forming acid, the soap of which tends to promote oil-in-water emulsions, neutralizing the sour oil by introducing a strong aqueous alkali into a stream of the former, separating partially spent alkali from neutralized oil, washing the neutralized oil by introducing steam in the proportion of at least about 100 pounds per barrel of oil into a stream of the former and condensing at least a portion of the steam in admixture with the neutralized oil, separating oil from aqueous condensate containing dissolved inorganic material, and drying the product.

2. The process of claim 1 wherein the petroleum stock treated is an oil having a viscosity of from about 45 to about 150 S. U. S./100° F. and where the acid dosage is at least 25 pounds acid per barrel of oil.

3. The process of claim 1 wherein the petroleum stock treated is an undiluted oil having a viscosity of at least about 1500 S. U. S./100° F. and wherein drying of the washed oil is carried out to provide a finished oil.

4. The process of claim 1 wherein the oil-soluble, organic, soap-forming acid is employed in the form of a concentrate comprising the acid itself and a hydrocarbon oil solvent.

5. The process of claim 1 wherein the oil-soluble, organic, soap-forming acid is selected from the group consisting of oleic acid, rosin, rosin oil, and petroleum acids.

6. In a process for treating petroleum stocks comprising continuously carrying out the steps of introducing sulfuric acid into a flowing stream of a petroleum stock having a viscosity of at least 45 S. U. S./100° F., separating acid sludge from sour oil, neutralizing the sour oil by introducing an aqueous alkali of an alkalinity at least equivalent to 12° Bé. caustic soda solution into a stream of the sour oil, separating partially spent alkali solution from the neutralized oil, washing the neutralized oil by introducing an aqueous material into a stream of the former, separating oil from aqueous material containing dissolved inorganic material and drying the product, the improvement comprising dividing the partially spent alkali solution into two portions, admixing a first portion with refortified alkali solution having an alkalinity greater than 12° Bé. caustic soda solution in an amount sufficient to provide a mixture having an alkalinity at least equal to 12° Bé. caustic soda solution, recycling this mixture to the sour oil stream, refortifying the second portion to an alkalinity greater than 12° Bé. caustic soda solution by admixing with a strong fresh alkali solution, permitting the refortified portion to settle for a period sufficient to permit a substantial proportion of salts dissolved in the partially spent alkali solution to be precipitated, admixing settled and refortified solution with the first portion of partially spent alkali solution as described above.

7. The process of claim 6 wherein the refortified alkali is permitted to settle for about twenty-four hours.

8. The process of claim 6 wherein the refortified alkali solution and the mixture of partially spent alkali and refortified alkali have an alkalinity equal to that of 20°–30° Bé. caustic soda solution.

9. A process for treating petroleum stocks comprising continuously carrying out the steps of introducing sulfuric acid into a flowing stream of a petroleum stock having a viscosity of at least 45 S. U. S./100° F., separating acid sludge from sour oil, neutralizing the sour oil by introducing an aqueous alkali of an alkalinity at least equivalent to 12° Bé. caustic soda solution into a stream of the sour oil, separating partially spent alkali solution from the neutralized oil by gravity settling, dividing the partially spent alkali solution into two portions, admixing a first portion with refortified alkali solution having an alkalinity greater than 12° Bé. caustic soda solution in an amount sufficient to provide a mixture having an alkalinity at least equal to 12° Bé. caustic soda solution, recycling this mixture to the sour oil stream, refortifying the second portion to an alkalinity greater than 12° Bé. caustic soda solution by admixing with a strong fresh alkali solution, permitting the refortified portion to settle for a period sufficient to permit a substantial proportion of salts dissolved in the partially spent alkali solution to be precipitated, admixing settled and refortified alkali solution with the first portion of partially spent alkali solution as described above, washing the neutralized oil by introducing steam in the proportion of at least about 100 pounds per barrel of oil into the former and condensing at least a portion of the steam in admixture with the neutralized oil, separating oil from the aqueous condensate containing dissolved inorganic material by gravity settling and drying the product.

10. A process for treating petroleum stocks comprising continuously carrying out the steps of introducing sulfuric acid into a flowing stream of a petroleum stock having a viscosity of at least 45 S. U. S./100° F. and which has excessive emulsion-forming tendencies during alkali neutralization and washing, separating acid sludge from sour oil, introducing into a stream of the sour oil a minor proportion of an oil-soluble organic soap-forming acid, the soap of which tends to promote oil-in-water emulsions, neutralizing the sour oil by introducing aqueous alkali having an alkalinity at least equal to 12° Bé. caustic soda solution into a stream of the sour oil, separating partially spent alkali from neutralized oil by gravity settling, dividing the partially spent alkali into two portions, admixing a first portion with refortified alkali having an alkalinity greater than 12° Bé. caustic soda solution in an amount sufficient to provide a mixture having an alkalinity at least equal to 12° Bé. caustic soda solution, refortifying the second portion to an alkalinity greater than 12° Bé. caustic soda solution by admixing with strong fresh aqueous alkali, permitting the refortified portion to settle for a period sufficient to permit a substantial proportion of the salts dissolved in the partially spent alkali to be precipitated, admixing settled, refortified, aqueous alkali with the first portion of spent alkali as described, washing the neutralized oil by introducing steam in the proportion of at least about 100 pounds per barrel of oil into a stream of the former and condensing at least a portion of the steam in admixture with the neutralized oil, separating oil from aqueous condensate containing dissolved inorganic material by gravity settling, and drying the product.

11. A process for treating petroleum stocks comprising continuously carrying out the steps of introducing sulfuric acid into a flowing stream of a petroleum stock having a viscosity of at least 45 S. U. S./100° F., separating acid sludge from sour oil, neutralizing the sour oil by introducing an aqueous alkali solution having an alkalinity at least equal to 12° Bé. caustic soda solution into a stream of the sour oil, where the alkali:sour oil volume ratio is from about 1:1 to 5:1, and where the neutralization temperature is at least about 100° F., separating partially spent alkali solution from neutralized oil by gravity settling at a temperature of at least about 150° F., dividing partially spent alkali into two portions, admixing a first portion with refortified alkali having an alkalinity greater than 12° Bé. caustic soda solution in an amount sufficient to provide a mixture having an alkalinity at least equal to 12° Bé. caustic soda solution, recycling the mixture to the sour oil stream, refortifying a second portion to an alkalinity greater than 12° Bé. caustic soda solution by admixing with strong fresh aqueous alkali, permitting the refortified portion to settle for about twenty-four hours, whereby a substantial proportion of the salts dissolved in the partially spent alkali solution are precipitated, admixing settled, refortified alkali solution with the first portion of spent alkali as described above, washing the neutralized oil by introducing steam into a stream of the former and condensing at least a portion of the steam in admixture with the oil, separating oil from aqueous condensate containing dissolved inorganic material by gravity settling, again introducing steam into a stream of the once washed and settled oil, again condensing at least a portion of the steam in admixture with the oil, again separating oil from aqueous condensate containing dissolved inorganic material by gravity settling, and drying the product, the total contact time between the steam condensate and oil prior to separation being from a few seconds to about three minutes, and the total amount of steam employed being at least about 100 pounds per barrel of oil.

12. A process for treating petroleum stocks comprising continuously carrying out the steps of introducing sulfuric acid into a flowing stream of a petroleum stock having a viscosity of at least 45 S. U. S./100° F. and which has excessive emulsion-forming tendencies during alkali neutralization and washing, separating acid sludge from sour oil, introducing into a stream of the sour oil a minor proportion of an oil-soluble, organic, soap-forming acid selected from the group consisting of oleic acid, rosin, rosin oil and petroleum acids, neutralizing the sour oil by introducing an aqueous alkali solution having an alkalinity at least equal to 12° Bé. caustic soda solution into a stream of the sour oil, where the alkali:sour oil volume ratio is from about 1:1 to 5:1, and where the neutralization temperature is at least about 100° F., separating partially spent alkali solution from neutralized oil by gravity settling at a temperature of at least about 150° F., dividing spent alkali into two portions, admixing a first portion with a refortified alkali having an alkalinity greater than 12° Bé. caustic soda solution in an amount sufficient to provide a mixture having an alkalinity at least equal to 12° Bé. caustic soda solution, recycling the mixture to the sour oil stream, refortifying a second portion to an alkalinity greater than 12° Bé. caustic soda solution by admixing with strong fresh aqueous alkali, permitting the refortified portion to settle for about 24 hours, whereby a substantial proportion of the salts dissolved in the spent caustic are precipitated and settled out, admixing settled, refortified alkali solution with the first portion of spent alkali as described above, washing the neutralized oil by introducing steam into a stream of the former and condensing at least a portion of the steam in admixture with the oil, separating oil from aqueous condensate containing dissolved inorganic material by gravity settling, again introducing steam into a stream of the once washed and settled oil, again condensing at least a portion of the steam in admixture with the oil, again separating oil from aqueous condensate containing dissolved inorganic material by gravity settling, and drying the product, the total contact time between the steam condensate and oil prior to separation being from a few seconds to about three minutes, and the total amount of steam utilized being at least about 100 pounds per barrel of oil.

References Cited in the file of this patent

UNITED STATES PATENTS

| | | |
|---|---|---|
| 2,177,734 | McNeil | Oct. 31, 1939 |
| 2,261,206 | Archibald | Nov. 4, 1941 |
| 2,294,884 | Archibald | Sept. 8, 1942 |
| 2,303,077 | Giraitis | Nov. 24, 1942 |
| 2,321,290 | Giraitis | June 8, 1943 |
| 2,335,006 | Giraitis | Nov. 23, 1943 |
| 2,361,455 | Chechot | Oct. 31, 1944 |
| 2,627,496 | Stratford | Feb. 3, 1953 |
| 2,658,027 | Hoover | Nov. 3, 1953 |